US011556597B2

(12) United States Patent
Kondore et al.

(10) Patent No.: US 11,556,597 B2
(45) Date of Patent: Jan. 17, 2023

(54) METHODS AND SYSTEMS FOR GENERATING MULTIPLE SCANNED FILES OF DIFFERENT RESOLUTIONS WHEN SCANNING A DOCUMENT

(71) Applicant: XEROX CORPORATION, Norwalk, CT (US)

(72) Inventors: Shalini Kondore, Old Alwal (IN); Srinivasarao Bindana, Kikinada (IN); Sainarayanan Gopalakrishnan, Chennai (IN); Nithya Theerthagiri, Sholinganallur (IN); Dara N Lubin, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/235,189

(22) Filed: Apr. 20, 2021

(65) Prior Publication Data
US 2022/0335091 A1    Oct. 20, 2022

(51) Int. Cl.
*G06F 16/93*    (2019.01)
*G06V 30/148*    (2022.01)
*H04N 1/00*    (2006.01)
*G06V 30/10*    (2022.01)

(52) U.S. Cl.
CPC ............ *G06F 16/93* (2019.01); *G06V 30/153* (2022.01); *H04N 1/00127* (2013.01); *G06V 30/10* (2022.01)

(58) Field of Classification Search
CPC ..... G06F 16/93; G06K 9/344; G06K 2209/01
See application file for complete search history.

(56) References Cited

U.S. PATENT DOCUMENTS

| | | | |
|---|---|---|---|
| 5,872,642 A * | 2/1999 | Walker | H04N 1/00127 358/462 |
| 7,646,508 B2 | 1/2010 | Eschbach | |
| 8,761,532 B2 | 6/2014 | Farrell et al. | |
| 10,460,191 B1 * | 10/2019 | Pribble | H04N 1/40068 |
| 10,956,107 B1 | 3/2021 | Gopalakrishnan et al. | |
| 2006/0245018 A1 * | 11/2006 | Byun | H04N 1/00482 358/527 |
| 2012/0212787 A1 * | 8/2012 | Hasegawa | H04N 1/3935 358/447 |

* cited by examiner

*Primary Examiner* — Keith D Bloomquist
(74) *Attorney, Agent, or Firm* — Jones Robb, PLLC

(57) ABSTRACT

The disclosure discloses methods and systems for automatically generating multiple scanned files when scanning a document at a multi-function device. The method includes receiving a multi-page document for scanning from a user. A user interface is provided to the user to input one or more keywords and one or more desired resolution values, where the input resolution values are different from a default resolution value set at the multi-function device. A page of the document is scanned to generate a scanned page of a default resolution value. The scanned page is checked if including the one or more input keywords. Accordingly, the default resolution value of the page is converted to the user desired resolution value. The scanning, checking, and converting are repeated till all the pages of the document are scanned. Multiple scanned files of different resolution values are automatically generated from single scan activity.

18 Claims, 7 Drawing Sheets

METHODS AND SYSTEMS FOR GENERATING MULTIPLE SCANNED FILES OF DIFFERENT RESOLUTIONS WHEN SCANNING A DOCUMENT

TECHNICAL FIELD

The present disclosure relates to the field of scanning. More specifically, the disclosure relates to methods and systems for generating multiple scanned files of different resolutions when scanning a document.

BACKGROUND

Modern day multi-function devices (MFDs) provide a wide range of scan resolutions such as 100 DPI (Dots per Inch), 300 DPI, 600 DPI, 800 DPI and so on, allowing users to scan documents at any resolution value. Typically, a document is scanned at a single resolution value such as 600 DPI. For example, when a user submits a document for scanning, a scanned document is generated where all pages of the scanned document have a single resolution value, for example, 600 DPI. However, there can be scenarios where the user wants certain pages of a document to be scanned at a higher resolution and certain pages to be scanned at lower resolution for various reasons. As an example, a user may want certain pages of a document having images or graphs to be scanned at a higher resolution, say 600 DPI, and remaining pages having text at a lower resolution, say 200 DPI.

To cater to such scenarios, the user may either scan all pages of the document at a higher resolution value i.e., 600 DPI but this may increase the size of the output scanned document. As a result, the user may not be able to email the document due to size limitations of sending documents via email. Further, the user may opt to scan all the pages of the document at lower resolution, say 200 DPI, which may reduce the size of the scanned document, however, the resolution/quality of the charts and images becomes poor. One approach can be to reduce the size of the document by scanning pages having regular content, i.e., text etc. at the lower resolution i.e., 200 DPI and scanning the pages having important content, i.e., images, charts, signature at a higher resolution i.e., 600 DPI. This way the overall size of the scanned document can be within required limits and there is no compromise with the quality of the resolution of the important content in the document.

However, in the above scenario, the user has to manually segregate the document into two parts—a first part including pages that are to be scanned at higher resolution and another part having pages to be scanned at lower resolution. Once segregated, the user is required to scan the two parts separately. Also, the user is required to collate the two parts once the scanning is done. This could be very frustrating and time consuming for the user. Moreover, this may require a third-party software that can be used to collate the two scanned documents, which may not be available to the user. In light of this, there is a need for improved methods and systems to efficiently manage scanning of documents.

SUMMARY

According to aspects illustrated herein, a method for automatically generating multiple scanned files when scanning a document is disclosed. The method includes receiving a document for scanning from a user, where the document includes multiple pages. A user interface is provided to the user to input one or more keywords and one or more desired resolution values, where the one or more desired resolution values are different from a default resolution value set at the multi-function device. A page of the document is scanned to generate a scanned page of a default resolution value. The scanned page is checked if the page includes the one or more keywords as input by the user. Based on the check, the default resolution value of the scanned page is converted to a desired resolution value as input by the user. The steps of scanning, checking, and converting are repeated till all pages of the submitted document are scanned. Subsequently, multiple scanned files of different resolution values are automatically generated as an outcome of a single scan activity.

According to further aspects illustrated herein, a multi-function device for automatically generating multiple scanned files when scanning a document is disclosed. The multi-function device includes a receiver for receiving a document for scanning from a user, where the document includes multiple pages. A user interface is provided to input one or more keywords and one or more resolution values, where the one or more resolution values are different from a default resolution value set at the multi-function device. A scanner scans a page of the document to generate a scanned page of a default resolution value. A controller checks if the scanned page includes the one or more keywords as input by the user. Based on the check, the default resolution of the scanned page is converted to a desired resolution value as input by the user. The controller repeats the scanning, checking, and converting till all pages of the submitted document are scanned. Based on the different resolution values, the controller automatically generates multiple scanned files of different resolutions as an outcome of a single scan activity.

According to furthermore aspects illustrated herein, a method includes receiving a document for scanning from a user, where the document includes multiple pages. A user interface is provided to the user to input one or more keywords and a user desired resolution value different from a default resolution value. Multiple scanned files are generated having different resolution values as input by the user, where one scanned file is having a default resolution value and another scanned file is having the user desired resolution value as input by the user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
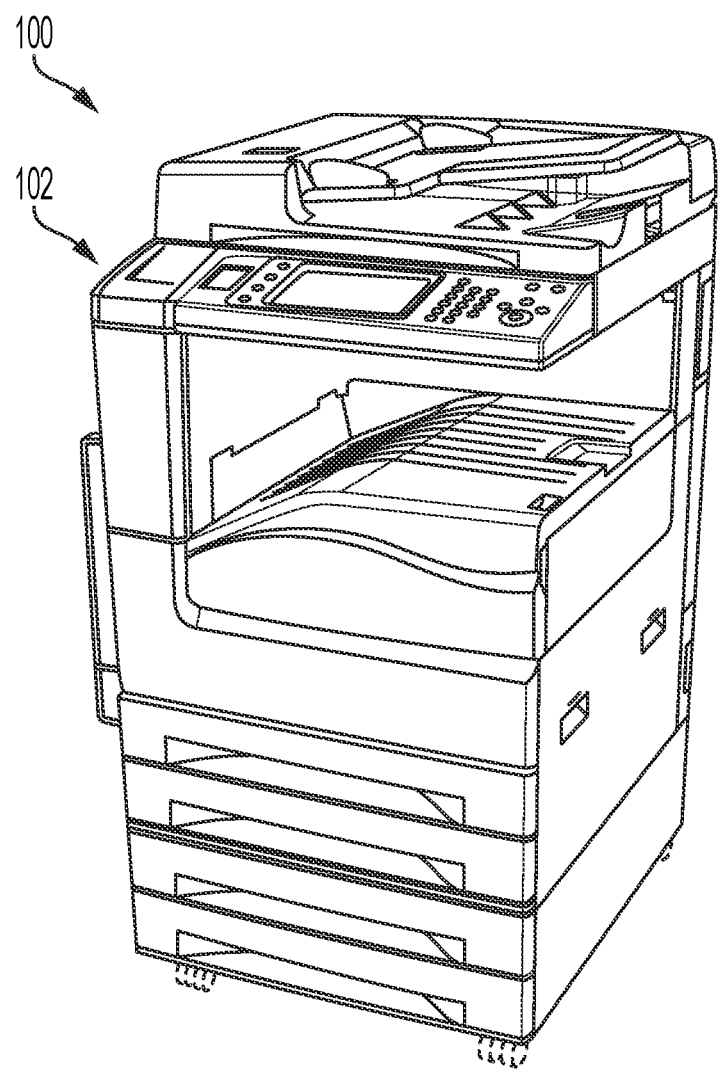
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, imaging, or the like. The multi-function device may include software, hardware, firmware, and a combination thereof. In the context of the current disclosure, the multi-function device generates multiple scanned files having one or more resolution values, when scanning a single document. The multi-function device generates multiple scanned files based on one or more keywords and resolution values input by a user. The multiple scanned files are generated as a result of a single scan activity by the user. In other words, the user is not required to scan a document multiple times to obtain multiple scanned files of different resolution values.

The term "document" refers to a document having multiple pages. The document is submitted for scanning at the multi-function device by the user. The document may be referred to as an input document.

The term "keywords" refer to one or more keywords input by the user when scanning the document. The keywords may be in the form of text, numeric, alphanumeric, image, graphics, or a combination of these. In context of the current disclosure, based on the one or more matching keywords input by the user, one or more pages of the document are scanned at one or more resolution values input by the user.

The term "matching" refers to the one or more keywords that are either exact same or related to the one or more keywords input by the user. For example, if a keyword input by the user is 'image', some of the matching keywords can be 'image', 'images', 'Pictures', 'Figures' and so on. In context of the present disclosure, when the user inputs one or more keywords while scanning the document, one or more pages including the matching keywords are identified. Based on the identified pages, multiple scanned files of different resolution values are generated. The matching keywords can be acronyms, synonyms, substitutions, short forms, or keywords that are associated to the input keywords, e.g., short names related to the input keyword, substitutions, or shortcuts set forth by a user.

The term "resolution value" refers to a resolution at which pages of the input document are scanned. Exemplary resolution values can be 100 DPI, 200 DPI, 400 DPI, 600 DPI, or the like. If an image is scanned at a resolution of 200 DPI, the image includes 200 dots per inch. Higher the resolution value better is the clarity of the image. In context of the present disclosure, while scanning the document, the user provides an input resolution value (also referred as user desired resolution value) for one or more pages of the document. Based on the input resolution values, the one or more pages are scanned at the input resolution values as compared to the remaining pages of the document. Typically, all the pages of the input document submitted in a single submission are scanned at a single resolution, which is a default resolution value of the multi-function device. In the context of the disclosure, different pages of the input document can be scanned at different scan resolutions. For example, the pages having important content such as images, signatures, or the like, can be scanned at higher resolution and the pages having text-based content can be scanned at the default or lower resolution.

The "default resolution value" can be any resolution value as set by an admin user or as set by the manufacturer of the multi-function device for scanning documents. The default resolution value can be a maximum resolution value, can be a minimum resolution value or any other resolution value supported by the multi-function device as set for scanning any documents from one or more users.

The term "multiple scanned files" refer to more than one scanned file generated as an outcome of scanning the document. The multiple scanned files are generated based on the input one or more keywords and the input resolution values. For example, a user scanning a 10-page document can be segregated into two scanned files—a first scanned file including a keyword 'signature' and a second scanned file including remaining pages without the keyword signature. In context of the present disclosure, the resolution values of the two scanned files are different such that the scanned file including the keyword is scanned at a user input/desired resolution value and the second file is scanned at the default resolution value of the multi-function device.

Overview

The present disclosure discloses methods and systems to automatically generate multiple scanned files when scanning a document. The methods and systems propose a new feature to generate multiple scanned files of different resolutions out of a single scan activity. The feature allows generation of the multiple scanned files based on one or more keywords and one or more resolution values, as input by the user. Unlike conventional methods and systems, the user is not required to manually segregate one or more pages of the document and set different resolutions to generate multiple scanned files. Therefore, the present disclosure provides an easy approach to segregate a single document into multiple scanned files of different resolutions based on a single scan activity.

The methods and systems allow the user to enter one or more keywords and corresponding one or more resolution values based on which pages including the input keywords are scanned at the one or more resolution values. For example, if a user is scanning an application form and wishes to scan page including an identity proofs such as PAN card at a higher resolution, he enters a keyword 'PAN' and selects a resolution values (e.g., 400 DPI) for scanning the page identified with the entered keyword. As a result, two scanned files are generated upon scanning the document—a first scanned file including one or more pages identified to include matching keyword 'PAN', where the pages are scanned at 400 DPI resolution, and a second scanned file including remaining pages scanned at a default resolution value. This way the present disclosure saves user's time and effort in creating multiple scanned files from a single document, where each scanned file is scanned at a different resolution value.

Exemplary Environment

FIG. 1 shows an exemplary environment 100 in which various embodiments of the disclosure can be practiced. The environment 100 includes a multi-function device 102 that provides one or more functionalities such as printing, scanning, imaging, copying, or the like. In context of the present disclosure, the multi-function device 102 allows a user to automatically generate multiple scanned files of different resolutions when scanning a document of multiple pages. The multi-function device 102 as shown is exemplary in nature but the environment may include other equivalent devices such as scanners, multi-peripheral devices, etc. for implementing the current disclosure. The multi-function device 102 may include various suitable components that are required to implement the current disclosure, although not shown.

In operation, a user wishes to scan a document to generate multiple scanned files of different resolutions. The document includes multiple pages such that the user is willing to scan one or more pages of the document at a higher resolution as compared to the remaining pages. The user submits the document for scanning at the multi-function device 102. Once submitted, the multi-function device 102 provides an option to generate multiple scanned files of different resolutions. The user selects the option. Upon selection, the multi-function device 102 allows the user to input one or more keywords along with one or more resolution values. Once the user provides the input and initiates scanning, the multi-function device identifies one or more pages of the document including the input keywords. The multi-function device scans the identified pages at the selected resolution value and scans remaining pages of the document at a default resolution value. Here, the default resolution is the preset resolution value at which the multi-function device 102 scans. The default resolution can be preset by the manufacturer of the multi-function device 102 or by an administrator For the sake of clarity one example is discussed. In this example, a user is scanning a 10-page document and wished to scan page numbers $3^{rd}$ $5^{th}$ and $7^{th}$ including a signature at higher resolution. When the user submits the document for scanning, he provides "signature" as the input keyword and selects 600 DPI as the resolution value at the multi-function device 102. Here, the default resolution value of the multi-function device 102 is 300 DPI. Once scanning is completed, the multi-function device 102 generates two scanned files—a first file including page numbers $3^{rd}$, $5^{th}$ and $7^{th}$ scanned at 600 DPI resolution, and a second scanned file having remaining pages (1, 2, 4, 6, 8-10) scanned at the 300 DPI resolution. This way, the multi-function device 102 scans a document to generate multiple scanned files of different resolutions.

Exemplary Multi-Function Device

Figure 2:
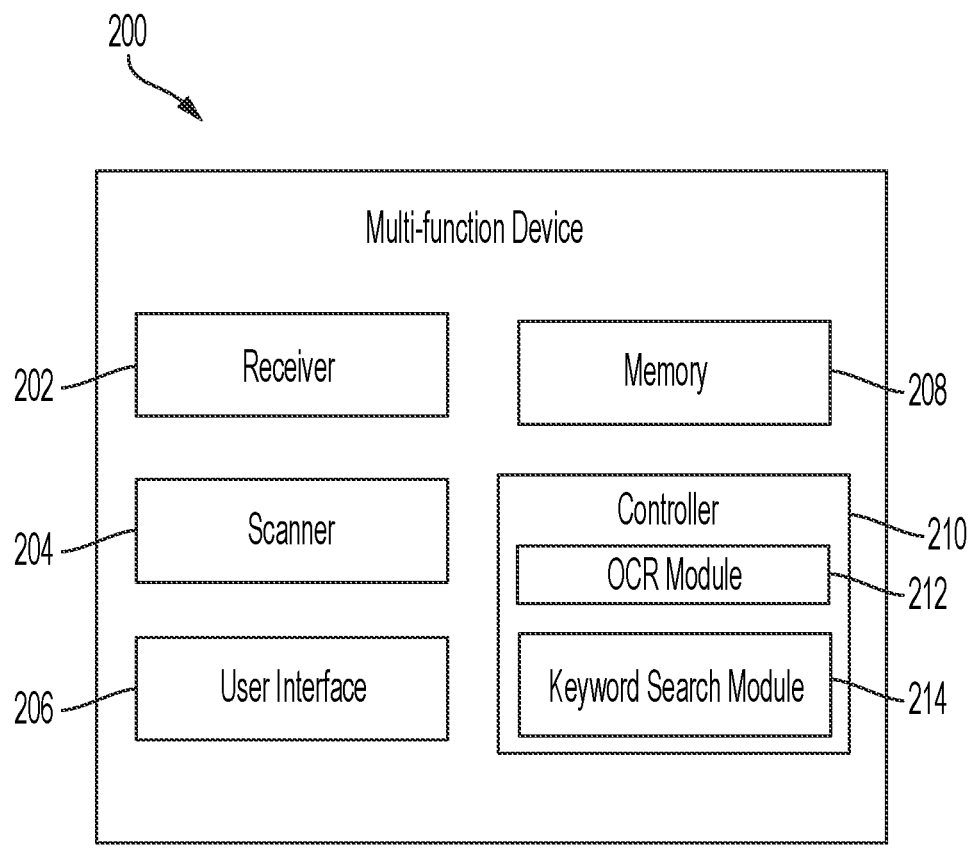
FIG. 2 is a block diagram illustrating a multi-function device and its components, in accordance with an embodiment of the present disclosure.

FIG. 2 is a block diagram of a multi-function device 200 and its various components, in accordance with an embodiment of the current disclosure. As shown, the multi-function device 200 includes a receiver 202, a scanner 204, a user interface 206, a memory 208, and a controller 210 including an OCR module 212 and a keyword search module 214. The components 202-214 are connected to each other via a conventional bus or a later developed protocol. And the components 202-214 communicate with each other for performing various functions of the present disclosure. The multi-function device 200 may further include additional component(s) as required to implement the present disclosure. Also, the multi-function device 200 may perform functions and operations similar to the multi-function device 102 of FIG. 1.

The implementation begins when a user wishes to scan a document to generate multiple scanned files of different resolutions. The user submits the document at the multi-function device 200 for scanning. Upon submission, the receiver 202 receives the document. The receiver 202 can include any automatic document feeder (ADH) or a manual document feeder. For example, the receiver 202 can be Duplex Automatic Document Feeder (DADH) that receives the document and automatically feeds the document to the scanner 204 when the scanning is initiated. Those skilled in the art will appreciate that other types of receiver 202 can also be used without departing from the scope of the present disclosure.

Figure 3A:
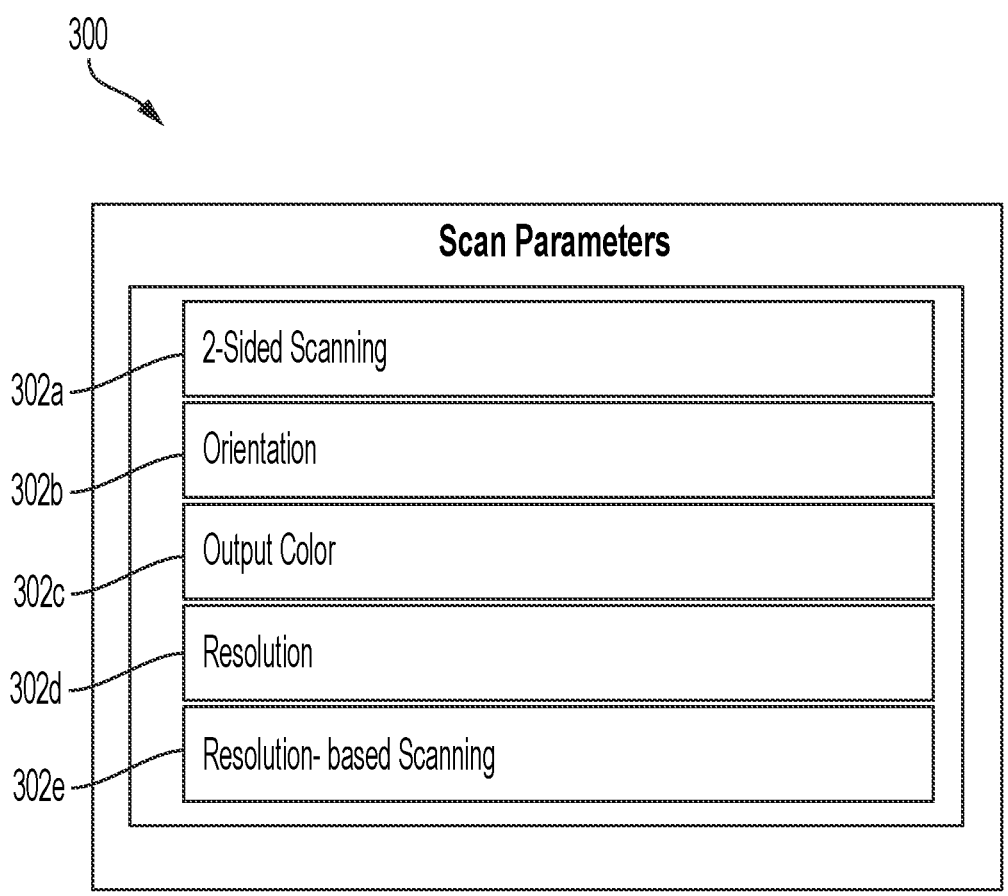
FIGS. 3A-3D are exemplary snapshots illustrating implementation of the present disclosure.

Once the document is received, the user interface 206 displays various scan parameters to the user for his selection. Exemplary scan parameters can be single/double-sided scanning, orientation of scan, resolution, and the like. In context of the present disclosure, an additional scan parameter is provided to the user that allows him to scan the document to generate multiple scanned files of different resolutions. One exemplary user interface 300 including such a scan parameter is shown in FIG. 3A. As illustrated, the user interface 300 displays the conventional scan parameters such as 2-sided scanning 302a, orientation 302b, output color 302c, and resolution 302d. The user interface 300 also includes a scan parameter 'Resolution-based Scanning' 302e that allows the user to scan one or more pages of the document at one or more user desired resolution values. The 'Resolution-based Scanning' 302e parameter allows the user to input one or more keywords and one or more resolution values. Based on the input one or more keywords, one or more pages including the keywords are identified and scanned at the selected one or more resolution values. The input one or more keywords can be text such as alphabets, numbers, alphanumeric text, special characters, and so on. The keyword can also be an image such as signature, logo, or the like.

Figure 3B:
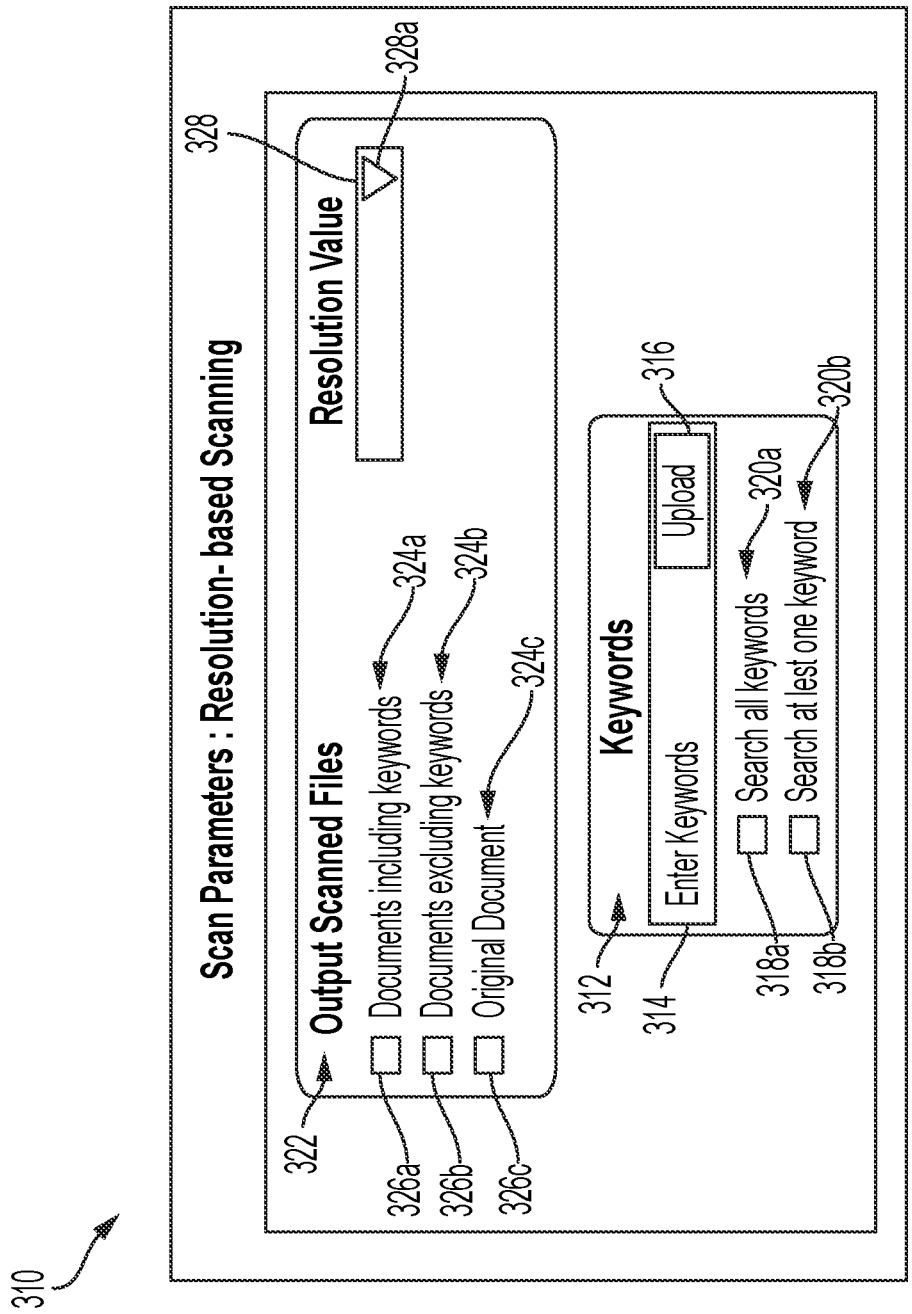

Once the user selects the 'Resolution-based Scanning' 302e parameter, another user interface is displayed to the user that allows the user to enter one or more keywords and corresponding one or more resolution values based on which multiple scanned files are to be generated. One such exemplary user interface 310 is shown in FIG. 3B. As shown, the user interface 310 includes options to input one or more keywords (marked as 312), one or more resolution values (marked as 328), and output scanned files (marked as 322) that are to be generated based on the input keywords and resolution values. The keywords option 312 allows the user to enter/input one or more keywords. Here, the user can either type the keywords in a blank box (marked as 314) or upload the input keywords by clicking on an 'upload' button (marked as 316). The option 312 further allows two sub-options—to search all the input keywords (marked as 320a) in the document or to search at least one keyword (marked as 320b) of the input keywords. The user can select the sub-option of his choice. For example, if the user is scanning a document related to anatomy and wishes to generate a scanned file having pages related to spinal cord at a specific resolution value, the user enters keywords such as 'spine', 'spinal cord', and 'spinal nerves' and selects the option 320b to identify pages having at least one of the input keywords. The user selects the option 320b by checking a checkbox 318b provided corresponding to the option 320b. In other example, the user may wish to select the other option 320a to identify pages having all the input keywords, therefore, he checks another checkbox 318a. The checkbox 318a is provided corresponding to the option 320a.

Based on the input one or more keywords, the user interface 310 also allows the user to select the one or more scanned files that are to be generated (marked as 322). As shown, the option 322 allows the user to generate multiple scanned files such as—a) a scanned file including the input keywords (marked as 324a), b) scanned file excluding the input keywords (marked as 324b), and c) scanned file that is similar to the originally submitted document (marked as 324c). The user can select corresponding checkbox (marked as 326a 326b, 326c) to select one or more of the respective options 324a-324c. Further, the user interface 310 provides an option to select resolution values (marked as 328) corresponding to the selected output files. For example, if the user wishes to generate a file including the input keywords 324a, he clicks on a dropdown button 328a provided corresponding to the option 324a to select a resolution value. Exemplary resolution values can be 72 DPI, 100 DPI, 150 DPI, 200 DPI, 300 DPI, 400 DPI, 600 DPI, etc. The user can select any desired resolution value from the available values to generate one or more scanned files.

This way, the user interface 310 allows the user to generate multiple scanned files based on user's input. For instance, if the user wishes to generate a scanned file excluding pages having all the input keywords at the default resolution value, the user selects the sub-options 320a and 324b. If the user wishes to generate a scanned file including all the keywords, he selects the sub-options 320a and 324a, and selects a required resolution value via the dropdown 328a. The user interface 310 is exemplary and any suitable sub-options/options can be included to generate multiple scanned files based on user's input.

Once the user selects the one or more keywords and other options to generate multiple scanned files of different resolutions, the scanner 204 initiates the scanning process. Once initiated, the receiver 202 submits a first page of the document to the scanner 204 for scanning. The scanner 204 scans the first page of the document and generates a scanned page at a default resolution. The scanned page is in an image file format such as .JPEG, .JPG, .PNG, .TIFF, and so on. Therefore, the Optical Character Recognition Module (OCR module) 212 converts the scanned page into a searchable format. In the present disclosure, the OCR module 212 converts each scanned page to a searchable format (e.g., MS word format) for identifying the one or more keywords as input by the user in the scanned page. Once converted, the keyword search module 214 searches the scanned page to check if the scanned page includes the one or more keywords as input by the user. If the page is identified to include the input keywords, the controller 210 converts the default resolution value of the scanned page to a desired resolution value as input by the user. If the page does not include the input keywords, the scanned page is stored in the memory 208 and the scanner 204 initiates scanning of the next page.

Similarly, the scanner 204 scans remaining pages of the documents one by one at a default resolution value. After each page is scanned, the OCR module 212 converts the scanned page to the searchable format for identifying the one or more keywords as input by the user in the scanned page. Once converted, the keyword search module 214 identifies whether the scanned image includes the one or more keywords inputted by the user. If the keyword search module 214 identifies that the scanned image includes the one or more keywords, the controller 210 converts the default resolution value of the scanned page to the desired resolution value as provided by the user and corresponding scanned image is saved in the memory 208. Further, if the keyword search module 214 identifies that the scanned image does not include the one or more keywords, then the scanned image generated upon scanning at default resolution is saved in the memory 208.

This way, the multi-function device 200 scans all the pages of the document such that pages identified to include input keywords are converted to have the user input resolution values and remaining pages are retained or saved at the default resolution value. All the scanned pages are temporarily stored in the memory 208. Once the scanning is completed, the controller 210 segregates the one or more scanned pages having the resolution values as input by the user and remaining pages having the default resolution value. Subsequently, the controller 210 combines the one or more scanned pages having same resolution value (i.e., user input/desired resolution value) and combines the scanned pages having different resolution value (e.g., default resolution value) together to generate multiple scanned files.

One example is discussed for the sake of clarity. In this example, a user wishes to scan a 10-page document at a multi-function device 200 having default resolution value set at 700 DPI. The user is willing to scan one of more pages of the document including a keyword 'image' at 600 DPI resolution value. As a first step, the user submits the document at the multi-function device 200. The user then inputs the keyword "image" and selects the option to generate a scanned file including the keyword at resolution value 600 DPI. The multi-function device 200 initiates the scanning process. Each page of the document is first scanned at 700 DPI, then if the page includes the keyword 'image', the multi-function device 200 converts the resolution value of the page to the selected resolution value of 600 DPI. Similarly, all the 10 pages of input document are scanned. Subsequently, the multi-function device 200 segregates the pages having common resolution values and generates multiple scanned files, where each scanned file includes one or more pages scanned at the common resolution value. This way, multiple scanned files of different resolution values are generated.

Figure 3C:
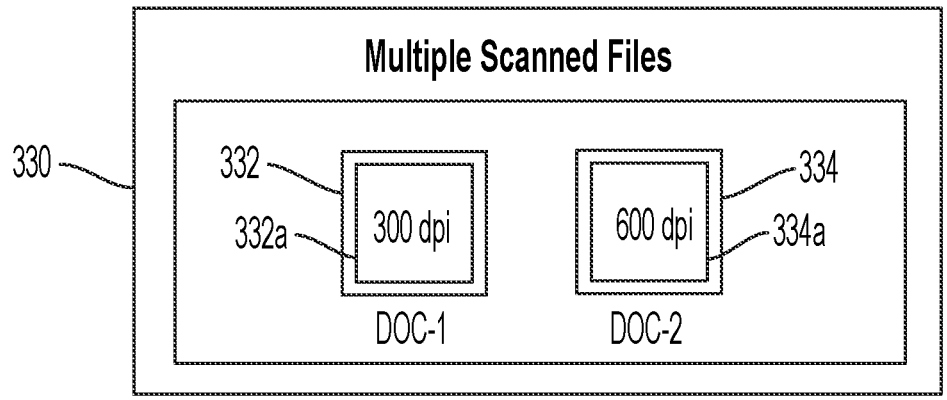

Once the multiple scanned files are generated, the controller 210 displays a preview of the scanned files to the user via the user interface 206. For example, the preview of the scanned file can include a thumbnail of each scanned file. The thumbnail may include information such as set of keywords used to generate the file, file size, and so on. The preview/thumbnail is presented to assist the user for easy identification of the generated scanned files. In some cases, the user can also access the individual scanned file by clicking on its thumbnail. This way, the user can identify the generated scanned file. One exemplary user interface 330 showing the preview of generated scanned files is shown in FIG. 3C. As illustrated, the user interface 330 includes preview of two scanned files (marked as 332 and 334) generated after scanning a document. As shown, a thumbnail 332a of the scanned file 332 includes the resolution value '300 DPI' and thumbnail 334a of the scanned file 334 includes the resolution value '600 DPI'. Here, the thumbnails 332a and 334a of the two files include the resolution value at which the two scanned files are generated.

Figure 3D:
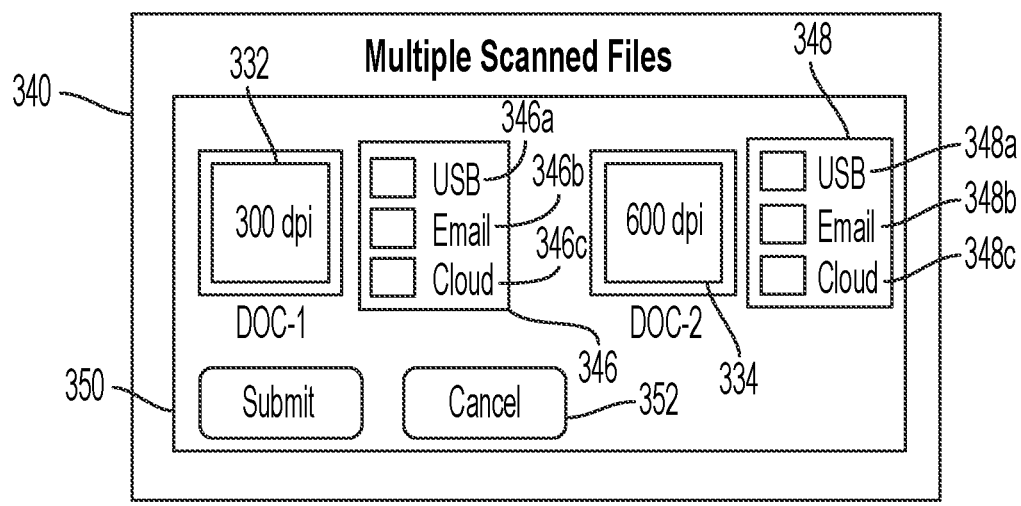

Subsequently, the user then selects one or more of the generated scanned files and perform a desired action. For instance, the user can share the one or more of the scanned files with one or more users via email. Further, the user can store the one or more of the scanned files in a USB drive connected to the multi-function device 200. Also, the user can save the one or more of the individual scanned documents at a desired cloud location that can be accessed at the multi-function device 200. One such exemplary user interface 340 is shown in FIG. 3D. As illustrated, the user interface 340 displays the generated scanned files 332 and 334. Further, each scanned file 332 and 334 is provided with one or more destinations (marked as 346 and 348, respectively). In particular, the destination options provided corresponding to the scanned file 332 are USB 346a, Email 346b, and Cloud 346c, and the destination options provided corresponding to the scanned file 334 includes USB 348a, Email 348b, and Cloud 348c. These are just examples and any suitable destination options can be provided. Once the user selects the desired destination option, the user submits (marked as 350) his selection to send the files 332 and 334 at the selected destinations. The user can click on cancel (marked as 352) to terminate or exit the process of sending files to the selected destinations.

The memory 208 stores all relevant information required for implementing the current disclosure. For example, the memory 208 temporarily stores scan parameters provided by the user. Any details stored in the memory 208 may be retrieved by the controller 210, OCR module 212 or other components for implementing the current disclosure.

FIG. 2 is explained with respect to a scenario in which the user scans a document having one or more pages to obtains one or more scanned files based on user selected keywords and resolution values. In the discussed scenario, the scanned files are generated to either include or exclude a common set of keywords input by the user. However, there can be a scenario where the user wishes to generate multiple scanned files based on mutually exclusive set of keywords. For instance, the user may wish to generate a first scanned file that includes a first set of keywords, say 'confidential' and 'client', and the user may wish to obtain a second scanned file that includes a second set of keywords, say 'signature' and 'sign'. The multi-function device 200 provides the option to create multiple scanned files based on multiple set of keywords.

While not discussed, the multi-function device 200 also provides a feature of displaying the size of each multiple scanned file that is to be generated, before finally generating the files. This allows the user to make any changes in the scanned files to adjust the file size to a required size. The file size of each file can be displayed along with the preview of the files. At this stage, the user can easily change the resolution values and/or other parameters and preview the scanned files before scanning begins. For example, the user can readjust the default resolution value to a further lower value to reduce the file sizes. This is just an example and the user can make any changes in the scan parameters to optimize the size of multiple files before generating the scanned files. Once the file sizes of the scanned files are displayed which can be useful for scan to email, the user proceeds to generate the scanned files. This way the user is not required to use trial and error to get the scanned files of desired size.

The multi-function device 200 may also provide an option of generating each file at multiple DPIs. Under this option, a single file is generated at 4 to 6 DPI settings and provides a preview of all the 4 to 6 DPI files. The Auto DPI selection can be 72 DPI, 200 DPI, 400 DPI, 600 DPI or 72 DPI, 150 DPI, 200 DPI, 300 DPI, 400 DPI and 600 DPI. After looking at the preview, the user can choose the DPI in which they feel their document is good and can submit the option to generate the output scanned file. Here, in the preview, the user can also be shown the approximate file size of each DPI file. This allows the user to choose the DPI file(s) that meets his requirement of the file size.

Exemplary Flowcharts

Figure 4:
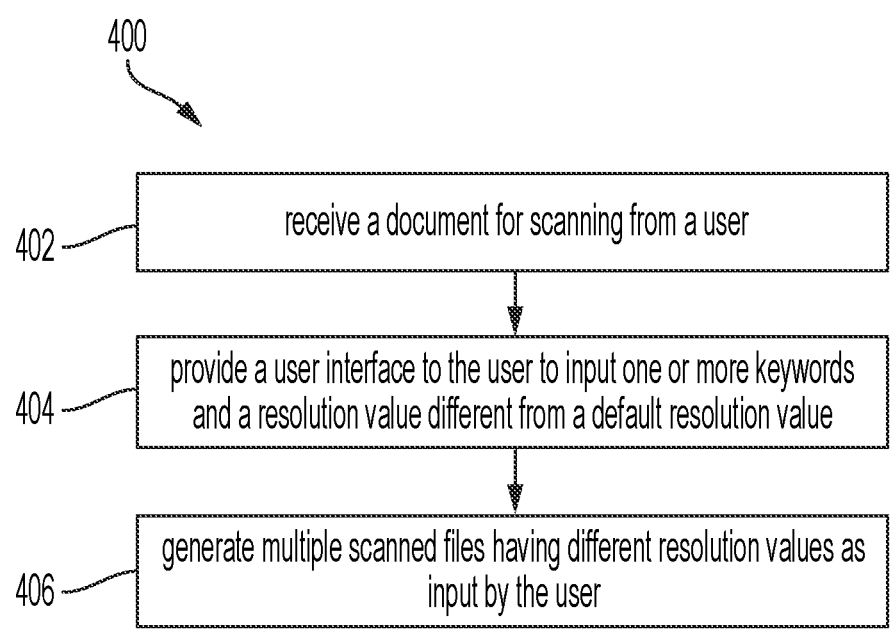
FIG. 4 is an exemplary method flowchart for automatically generating multiple scanned files when scanning a document.

FIG. 4 is a method flowchart 400 for generating multiple scanned files of different resolutions when scanning a document. The method 400 may be implemented at a multi-function device such as multi-function device 102 or 200 of FIG. 1 and FIG. 2, respectively.

Initially, a user submits a document for scanning at the multi-function device. At 402, the document is received for scanning from the user. The document includes multiple pages. At 404, a user interface is provided to the user to input one or more keywords and a resolution value. Here, the resolution value inputted by the user is different from a default resolution value of the multi-function device. Once the user provides his inputs, at 406, multiple scanned files having different resolution values are generated such that one scanned file is having the default resolution value and another scanned file is having the resolution value as input by the user. When the user input one or more keywords, the document is searched to identify pages having the input keywords and pages identified to include the keywords are converted to the resolution value as input by the user. Thereby generating the scanned file of resolution value as input by the user. In contrast, the remaining pages that do not include the input keywords remains at the default resolution value to generate the other scanned file. This way, the method 400 allows the user to generate multiple scanned files having different resolution values based on user's inputs. More details will be discussed below in conjunction with FIG. 5.

Figure 5:
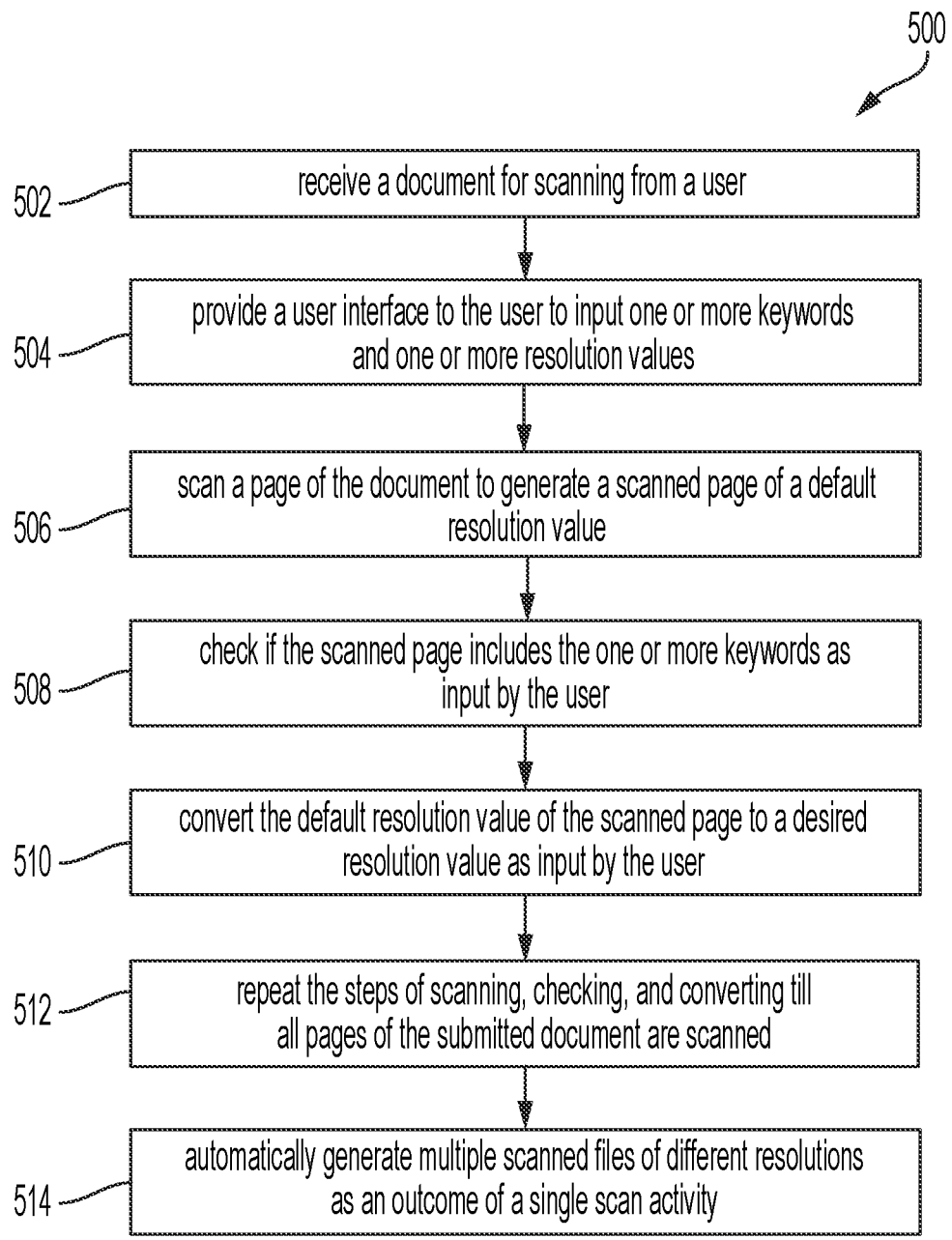
FIG. 5 is another exemplary method flowchart for automatically generating multiple scanned files when scanning a document, in accordance with an embodiment of the present disclosure.

FIG. 5 is a method flowchart 500 for automatically generating multiple scanned files of different resolution values when scanning a document. The multiple scanned files are generated based on one or more keywords as input by a user. The method 500 may be implemented at a multi-function device, such as the multi-function device 102 of FIG. 1, or the multi-function device 200 of FIG. 2. However, the method 500 can be implemented at any equivalent device with scanning functionalities.

The method 500 begins when a user wishes to scan a document to generate multiple scanned files of different resolution values. For example, the user may wish to scan a 10-page document such that one or more pages of the document including images are to be scanned at a higher resolution while the remaining pages including text can be scanned at a default resolution. To initiate, the user submits the document at the multi-function device for scanning. In particular, the user may submit or insert the document including multiple pages into an Automatic Document Feeder (ADF). Once submitted, at 502, the document is received from the user for scanning.

Once received, at 504, a user interface is provided to the user to input one or more keywords and one or more resolution values. The input one or more keyword can be a text such as alphabets, numbers, alphanumeric text, special characters, logo, image, signature, and so on. Further, the resolution values can include any value that the multi-function device is configured to provide. Exemplary resolution values can be in a range of 100-900 DPI including, but not limited to, 72 DPI, 100 DPI, 150 DPI, 200 DPI, 300 DPI, 400 DPI, 600 DPI. The user inputs one or more keywords and one or more resolution values for such that one or more pages of the document including the input keywords can be scanned at the selected resolution values. Along with the keywords and resolution values, the user may also select one or more conventional scan parameters such as default scan resolution, scan contrast, color, and so on.

Subsequently, at 506, a page of the document is scanned to generate a scanned page of a default resolution value.

Once generated, at 508, the scanned page is checked to identify if the scanned page includes the one or more keywords as input by the user. The scanned page is first converted to a searchable format and then the page is searched to identify if the input keywords are available in the scanned page.

Based on the check, at 510, the resolution value of the scanned page is converted to the user desired resolution value. In other words, if based on the check it is identified that the scanned image includes the one or more input keywords, the page is converted to the desired resolution value. For example, if the input keyword input by the user is 'image' and the corresponding input resolution value is 600 DPI, the page identified to include the keyword 'image' is converted to the resolution value 600 DPI.

Then, at 512, the steps of scanning, checking, and converting are repeated till all the pages of the submitted document are scanned. For example, the next pages are scanned one after the other and checked if the input keyword 'image' is available. The pages having the input keyword 'image' are converted to the user desired/input resolution value 600 DPI, whereas the pages that do not include the input keyword are scanned at the default resolution. This indicates that the pages that are not identified to include the keywords are not required to be converted, as these pages are already scanned at the default resolution value. All these pages once scanned and checked are stored in a temporary memory such as the memory of the multi-function device. Once all the pages are scanned, checked for the input one or more keywords, and converted based on availability of the input keywords, the pages are segregated. For example, one or more pages that are scanned at the default resolution values are segregated from the one or more pages that are scanned at the input one or more resolution values. This way the pages having common resolution value are combined together.

Once combined, at 514, multiple scanned files of different resolution values are automatically generated as an outcome of this single scan activity.

Optionally, a preview of each generated scanned file can be displayed to the user for his confirmation. The preview may include but not limited to scan resolution of the document, file size of the document, keyword present or absent in each scanned document, miniaturized image of the first page of each scanned document, title of each scanned document, a main image of the scanned document, and so on. The preview may be displayed to assist the user in identifying each individual scanned document.

Based on the preview, the user can select the one or more scanned files and can send the files to one or more destinations. For instance, the user can share one scanned file and can send to another user via email. The user may store another file at a cloud location and may store yet another file in a USB drive connected to the multi-function device. Further, the user can also download the one or more scanned files for later usage.

For converting resolution values of the pages having user input keywords, the methods and systems above implement the aspect of converting the resolution value of the one or more pages having the one or more user input keywords to the user desired resolution values. In such implementations, the multi-function device scans all pages of the document in one go at a maximum resolution value. Then, all the scanned pages scanned at the maximum resolution value are further converted to the user desired resolution value. For example, if all pages are initially scanned at the maximum resolution value such as 600 DPI and the user desired resolution value is 400 DPI, the multi-function device then checks for the scanned pages having the user input keywords. Based the keywords input by the user, the scanned pages having the user input keywords are separated from the remaining pages. Then, for the scanned pages having the user input keywords, the resolution value of those scanned pages is converted to the user desired resolution, for example 400 DPI. Finally, multiple scanned files are generated, —i.e., one scanned file having the scanned pages with the user desired resolution value is generated and a second scanned file with the remaining pages having the default resolution value is generated.

In other implementation, the aspect of converting pages to user desired resolution value may not be needed. In such implementations, page by page scanning of the document is implemented. For example, when a user inputs a document for scanning, the multi-function device scans a page at a default resolution value, checks for the user input keywords, if found, then rescans the scanned page at the user desired resolution value, then releases the page of the document. This way, the multi-function device scans all pages of the document and generates multiple scanned files with the user desired resolution values and the default resolution value. Here "rescanning" refers to scanning the page having the user input keywords again and then releases the page from the multi-function device.

In the above discussed methods 400 and 500, the user may generate multiple scanned files at different resolutions either to include one or more keywords or to exclude one or more keywords. For example, the user may provide a set of keywords and the pages excluding the keywords can be scanned at user selected resolution values. Here, the scanned files are generated at one or more different resolutions, where the different resolutions may be either more than a default resolution value or less than a default resolution value The present disclosure discloses methods and systems to generate multiple scanned files of different resolution as an outcome of a single scan activity. The methods and systems avoid any manual work by the user as he is not required to separately scan few pages of the document at higher resolution. This way user's time and effort is saved, as he can scan different pages of the document at different resolutions in a single scan activity. The methods and systems eliminate the man-made error that can otherwise be made if the user is required to separately scan pages of the document at different resolutions. The methods and systems enhance user experience and is very easy to implement.

The present disclosure successfully scans the document based on user input keywords and ensures that pages including the keywords are scanned at user provided resolution values. This automates the scanning process, and the user is no more required to manually separate the pages based on keywords for scanning the required pages at higher resolution. Therefore, a lot of time can be saved.

The methods and systems allow automatic identification of pages based on searching of the user input keywords by the multi-function device. So, the user is not required to manually identify the pages that are to be scanned at a different resolution value.

The present disclosure proposes a simple yet effective way of converting the pages including user specific keywords into a high-resolution scanned file.

Although the disclosure is discussed where user provides keywords based on which pages including the keywords are scanned at a different resolution value as compared to other pages, but the disclosure can be implemented for scenarios where the user provides page numbers or page range such that the specific pages are scanned at a different resolution values and remaining pages are scanned at the default resolution value.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, checking, rescanning, segregating, combining, generating, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for automatically generating multiple scanned files when scanning a document with a multi-function device, the method comprising:
   receiving a document for scanning from a user comprising multiple pages;
   providing a user interface to the user to input one or more keywords and one or more desired resolution values, wherein the one or more desired resolution values are different from a default resolution value set at the multi-function device;
   scanning a page of the document to generate a scanned page of a default resolution value;
   checking if the scanned page comprises the one or more keywords as input by the user;
   if the scanned page is identified to include the one or more keywords, converting the default resolution value of the scanned page to a desired resolution value as input by the user;
   repeating the steps of scanning, checking, and converting until all pages of the document are scanned; and
   automatically generating multiple scanned files of different resolution values as an outcome of a single scan activity by combining one or more scanned pages together having the same resolution value to generate one scanned file and combining the remaining pages having a different resolution value to generate another scanned file.

2. The method of claim 1, further comprising, performing an Optical Character Recognition (OCR) of each scanned page to identify the one or more keywords as input by the user.

3. The method of claim 1, further comprising, segregating one or more scanned pages having the default resolution value from remaining pages having the one or more desired resolution values.

4. The method of claim 1, further comprising, displaying a preview of the multiple scanned files to the user for confirmation.

5. The method of claim 1, wherein the one or more keywords comprise the one or more keywords to be included and the one or more keywords to be excluded.

6. The method of claim 1, further comprising, allowing the user to send the multiple scanned files to one or more destinations.

7. The method of claim 1, wherein the number of multiple scanned files of different resolutions are generated based on an input from the user.

8. The method of claim 1, wherein the method is implemented in the form of a non-transitory computer readable medium.

9. A multi-function device for automatically generating multiple scanned files when scanning a document, the multi-function device comprising:
   a receiver for receiving a document for scanning from a user comprising multiple pages;
   a user interface for inputting one or more keywords and one or more resolution values, wherein the one or more resolution values are different from a default resolution value set at the multi-function device;
   a scanner for: scanning a page of the document to generate a scanned page of a default resolution value; and
   a controller for:
   checking if the scanned page comprises the one or more keywords as input by the user;
   if the scanned page is identified to include the one or more keywords, converting the default resolution value of the scanned page to a desired resolution value as input by the user;
   repeating the scanning, checking, and converting until all pages of the document are scanned; and
   based on the different resolution values, automatically generating multiple scanned files of different resolutions as an outcome of a single scan activity by combining one or more scanned pages together having the default resolution value to generate one scanned file and combining the remaining pages having the one or more desired resolution values to generate another scanned file.

10. The multi-function device of claim 9, further comprising, an Optical Character Recognition (OCR) for identifying the one or more keywords as input by the user in the scanned page.

11. The multi-function device of claim 9, wherein the controller is for segregating one or more scanned pages having a default resolution value from remaining pages having a desired resolution value.

12. The multi-function device of claim 9, wherein the user interface is for displaying a preview of the multiple scanned files to the user for confirmation.

13. The multi-function device of claim 9, wherein the one or more keywords comprise the one or more keywords to be included and the one or more keywords to be excluded.

14. The multi-function device of claim 9, wherein the user interface is for allowing the user to send the multiple scanned files to one or more destinations.

15. The multi-function device of claim 9, wherein the one or more desired resolution values are one of: more than a default resolution value and less than a default resolution value.

16. A method comprising:
   receiving a document for scanning from a user comprising multiple pages;
   providing a user interface to the user to input one or more keywords and a user desired resolution value different from a default resolution value; and
   generating multiple scanned files having different resolution values as input by the user, wherein one scanned file having a default resolution value and another scanned file having the user desired resolution value as input by the user, the another scanned file comprising one or more pages that include the one or more keywords.

17. The method of claim 16, further comprising:

generating one scanned file having a default resolution value for all pages in the scanned file;

identifying one or more pages having the one or more keywords as input by the user;

separating the one or more pages with matching keywords from remaining pages of the scanned file;

converting the default resolution of the one or more matched pages to a different resolution value according to the desired resolution value as input by the user; and generating one scanned file of a different resolution value comprising the one or more pages with matched keywords and generating another scanned file comprising remaining pages of a default resolution value.

18. The method of claim 16, further comprising, providing an option to the user to send the multiple scanned files to one or more different destinations.

\* \* \* \* \*